US009917875B2

(12) United States Patent
Conklin et al.

(10) Patent No.: US 9,917,875 B2
(45) Date of Patent: *Mar. 13, 2018

(54) SYSTEM AND METHODS FOR MANAGING MEDIA CONTENT PLAYBACK USING SOCIAL MEDIA DATA

(71) Applicant: SCRIPPS NETWORKS INTERACTIVE, INC., Cincinnati, OH (US)

(72) Inventors: Frederick Conklin, Orinda, CA (US); Darren Boyd, San Francisco, CA (US); Ronald Dean Hallman, Jr., Columbia, SC (US); David Hallman, Redwood City, CA (US); Erik Sowa, Livermore, CA (US)

(73) Assignee: SCRIPPS NETWORKS INTERACTIVE, INC., Knoxville, TN (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/677,429

(22) Filed: Apr. 2, 2015

(65) Prior Publication Data
US 2016/0294907 A1    Oct. 6, 2016

(51) Int. Cl.
*H04L 29/08* (2006.01)
*H04L 29/06* (2006.01)
*G06F 17/30* (2006.01)

(52) U.S. Cl.
CPC ...... *H04L 65/604* (2013.01); *G06F 17/30867* (2013.01)

(58) Field of Classification Search
CPC ......... H04L 67/02; H04L 67/20; H04L 67/22; H04L 65/604
See application file for complete search history.

(56) References Cited

U.S. PATENT DOCUMENTS

| 2013/0031162 | A1* | 1/2013 | Willis | H04L 67/02 709/203 |
| 2013/0073568 | A1* | 3/2013 | Federov | G06F 17/30867 707/749 |
| 2013/0346877 | A1* | 12/2013 | Borovoy | H04L 65/403 715/753 |
| 2015/0095329 | A1* | 4/2015 | Sanio | G06F 17/30038 707/732 |

(Continued)

*Primary Examiner* — Dustin Nguyen
*Assistant Examiner* — Juan C Turriate Gastulo
(74) *Attorney, Agent, or Firm* — J.A. Lindeman & Co., PLLC

(57) ABSTRACT

Methods and systems for managing the playback of media content via a website accessed by a user computer are described. According to aspects, the methods and systems may access and retrieve various data associated with media content such as engagement data related to an interaction by a user with the media content playback, as well as social media data relating to playback of a set of media content by a set of additional users. The methods and systems may analyze any combination of the data to identify a relevant media file that may be of interest to the user and provide the media file to the user computer for playback by the user. The analysis models may be continuously updated and used to improve media selection and streamline partnerships with third-party entities.

22 Claims, 6 Drawing Sheets

(56) References Cited

U.S. PATENT DOCUMENTS

| | | | |
|---|---|---|---|
| 2015/0347593 A1* | 12/2015 | Tsai | G06Q 50/01 |
| | | | 707/722 |
| 2016/0066039 A1* | 3/2016 | Bhamidipati | G06F 17/30029 |
| | | | 725/14 |
| 2016/0088032 A1* | 3/2016 | Corbin | H04L 65/403 |
| | | | 715/716 |
| 2016/0261917 A1* | 9/2016 | Trollope | H04N 21/475 |

* cited by examiner

SYSTEM AND METHODS FOR MANAGING MEDIA CONTENT PLAYBACK USING SOCIAL MEDIA DATA

FIELD OF THE DISCLOSURE

The present disclosure generally relates to selecting media content for user playback and, more particularly, to systems and methods for analyzing various data from various sources to identify relevant media content to provide for user playback on media players.

BACKGROUND

For a number of years, individuals have viewed media content as traditional media broadcasts on television sets. Typically, the individuals tune to a specific channel and watch the programming content that is broadcast on that channel, or otherwise watch a recorded version of the programming content. Companies who produce and/or broadcast the content have decades worth of relevant engagement and ratings data to identify potentially popular content as well as create advertising strategies for the content. For example, networks may leverage demographics and ratings data during negotiations with advertisers who wish to target the viewers of the network.

However, there is an increasing amount of usage of "alternative" screens or devices for content consumption. In particular, individuals are increasingly using devices other than televisions to view or consume various media such as standalone videos and programming content. For example, individuals are increasingly using devices such as smartphones, tablets, notebook computers, and the like to view streaming videos directly on websites or via various dedicated applications. The alternative screens typically allow for more user interaction (e.g., skipping within videos) than does traditional television viewing. Further, individuals generally have less willingness to watch longer videos and advertisements on alternative screens. Accordingly, the traditional engagement data and third-party data that is associated with traditional television viewing is not necessarily applicable to alternative screen viewing. As a result, content producers and providers are not able to optimize content delivery for playback on alternative screens.

Therefore, there is an opportunity for techniques for gathering relevant data to improve content production and delivery to enhance the viewing experience for individuals.

SUMMARY

In an embodiment, a computer-implemented method of managing playback of media content in a media player embedded in a webpage hosted by a website server and accessed by a user computer is provided. The method includes detecting, by one or more processors, an initial playback of a media file within the media player, retrieving, by one or more processors, engagement data corresponding to interaction by a user during the initial playback of the media file, and receiving social media data related to playback of a set of media content by a set of additional users. The method further includes identifying, by the one or more processors based on the engagement data and the social media data, a preferred media file of the set of media content, and providing an identification of the preferred media file to the user computer to initiate playback of the preferred media file via the media player.

In another embodiment, a system for managing playback of media content in a media player embedded in a webpage hosted by a website server and accessed by a user computer is provided. The system includes a communication module configured to transmit data to the website server, a memory storing a set of computer-executable instructions, and a processor adapted to interface with the communication module and the memory. The processor is configured to execute the set of computer-executable instructions to cause the processor to detect an initial playback of a media file within the media player, retrieve, via the communication module, engagement data corresponding to interaction by a user during the initial playback of the media file, and receive social media data related to playback of a set of media content by a set of additional users. The processor is further configured to identify, based on the engagement data and the social media data, a preferred media file of the set of media content, and provide, via the communication module, an identification of the preferred media file to the user computer to initiate playback of the preferred media file via the media player.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
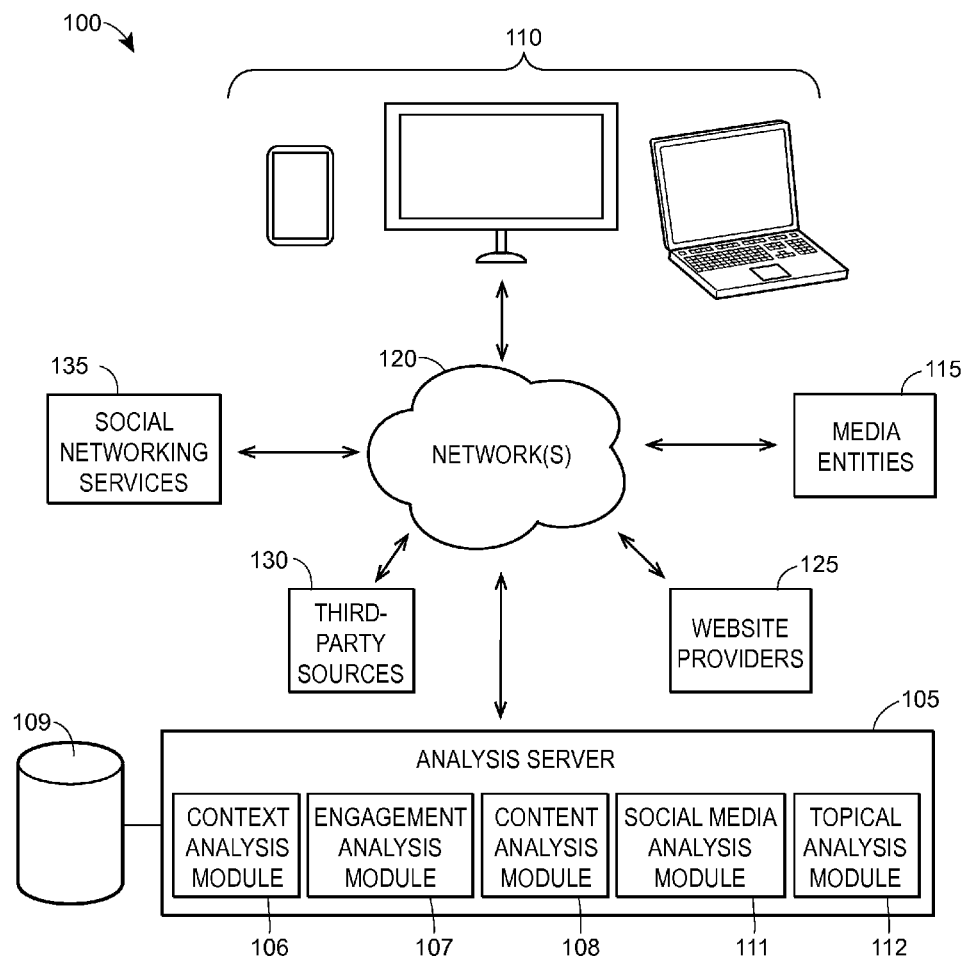
FIG. 1 depicts an example configuration including various components and entities associated with managing media content playback, in accordance with some embodiments.

The novel systems and methods disclosed herein relate generally to improving media content selection and delivery. According to certain aspects, the systems and methods are configured to interface with website providers that host websites accessible by users. The websites may support media players that enable users to view or otherwise consume various media content. For example, the media content may be videos, audio, images, and/or the like. The systems and methods may account for various data and combinations of data to improve the selection and delivery of media content via the websites.

Existing content delivery techniques enable users to view media content but offer limited features related to selecting relevant media content for the users to view. In this regard, users may not be engaged during interaction with the media player. This poses a problem for users because users ultimately may not find or view desired media content. This additionally poses a problem for website providers and other entities because user engagement is lacking. For example, a company's advertisement may not reach a target amount or type of viewers due to limited demographic data and/or a lack of ability to maintain viewer engagement.

The present embodiments describe one or more central servers that interface with a variety of entities to retrieve or otherwise access various types of data. The central server may analyze the data to select relevant media content in an effort to improve user engagement. The central server may be configured for a variety of analyses related to the media content selection as well as to the websites that support the media content. In particular, the central server may access context data that indicates a context or type of the websites (e.g., sports, lifestyle, entertainment, etc.), as well as various content data associated with the media content itself. Further, the central server may communicate with the website providers to retrieve engagement data related to user interaction with media content playback. The central server may analyze a combination of this data to identify media content having a greater relevancy to the website being visited as well as to the user and what the user wishes to view.

The central server may also interface with various social networking services to compile data related to content that is popular. The social media data may be especially relevant to a user if originated from "connections" of the user within a social networking service. In some scenarios, the users visiting the websites may wish to view popular content regardless of whether the users already know about the popular content. The central server may analyze the social network data singularly or in combination with the content, context, and/or engagement data to improve the media content identification. In some embodiments, the social media data may have a higher priority or weighting than the other data.

The central server may further interface with various third-party entities. In some cases, the third-party entities may be partners such as companies wishing to avail advertisements to website users. The central server may therefore prioritize some of the media content based on priority requirements from the business partners. In other cases, the third-party entities may offer applications or platforms to assist the central server with collecting various of the data to be analyzed, or may otherwise serve as sources for some of the data to be analyzed. The central server may also update its analysis models with updated data that is collected when users view content via the media players.

The systems and methods therefore offer numerous benefits. In particular, users of websites are presented with more relevant media content or otherwise with media content that the users enjoy viewing. Further, websites may improve user engagement metrics by providing users with content that is more relevant to the websites as well as to the users, which can lead to increased revenues. Advertising metrics may also be improved when the users are more engaged with viewing advertisements. The systems and methods further enable the central entities to continuously improve its analysis models with a continuously increased value to numerous entities as well as end users.

The systems and methods discussed and envisioned herein may be extended to a wide variety of technologies and technical fields. In particular, the systems and technologies may be implemented across various industries such as entertainment, advertising, news, education, and others. The systems and methods, therefore, improve content selection and delivery across all of these technologies and technical fields.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

FIG. 1 depicts an example environment 100 associated with processing various data improve media selection and playback. Although FIG. 1 depicts certain entities, components, and devices, it should be appreciated that additional or alternate entities and components are envisioned.

As illustrated in FIG. 1, the environment 100 includes an analysis server 105 configured to facilitate various of the functionalities as discussed herein. The analysis server 105 may include any combination of hardware and software modules or applications that are configured to support and implement various features of the described systems and methods. Further, the analysis server 105 may be associated with any company, corporation, individual, group of individuals, or the like. Generally, the analysis server 105 is configured to compile and analyze data from various sources and entities to facilitate the selection of media content for user playback. As used herein, "media content" may refer to any type of digital media data configured to be communicated between components as well as output via hardware devices. In particular, the media content may include, but is not limited to, audio data, video data, image data, and/or any combination thereof. The media content may be in the form of media files having various formats such as, for example, .wm, .wmv, .asf, .m2ts, .m2t, .mov, .qt, .avi, .wtv, .dvr-ms, .mp4, .mov, .mov, .mpeg, .mpg, .mpe, .m1v, .mp2, .mpv2, .mod, .vob, .m1v, .avi, .mov, .asx, .wm, .wma, .wmx, .wav, .mp3, .m3u, .aac, .jpg, .jpeg, .hdp, .wdp, .tif, .tiff, .raw, .gif, .bmp, .png, and/or other standard or proprietary formats.

The analysis server 105 may interface with storage 109 that stores various information and data that may be accessed by the analysis server 105. The storage 109 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Although illustrated as separate from the analysis server 105, it should be appreciated that the storage 109 may alternatively be included as part of the analysis server 105.

The analysis server 105 is configured to communicate with one or more media entities 115 and one or more website providers 125 via one or more networks 120. Generally, the media entities 115 produce, avail, and/or otherwise store media content for viewing by users. For example, a company may produce and locally host a set of video advertisements. In some cases, the analysis server 105 may retrieve media content from the media entities 115 and store the retrieved media content in the storage 109. In other cases, the analysis server 105 may identify or access a location (e.g., a uniform resource locator (URL)) of media content stored on the media entities 115. It should be appreciated that the media content may originate from other entities other than the media entities 115.

The website providers 125 are configured to host websites for access by the users. In embodiments, the websites of the website providers 125 may support various media players via which media content may be accessed, viewed, or the like. In particular, when a user accesses a website using an electronic device, the website may render a corresponding media player on the web browser of the electronic device. Although the embodiments describe the media players being rendered within a web browser, it should be appreciated that the media players may be implemented, accessed, rendered, or the like within other components or programs such as, for example, dedicated applications installed on electronic devices. It should be appreciated that various types and implementations of the media players are envisioned. In some cases, a media player of a website may be programmed within code (e.g., computer-readable instructions) associated with the website so that when a user accesses the website, the media player appears embedded within the website. It should be appreciated that the website may support the media player via other techniques. Generally, a media player enables media content such as various media files to be played or output therefrom. The media player may support playback of single media files and/or multiple media files that may be arranged in one or more playlists. The media player may access and retrieve the media content from various sources such as the storage 109, the media entities 115, or other sources. In some cases, the website providers 125 may locally host the media content.

The users may use a variety of electronic devices 110 to access the media players and the associated media content via the websites of the website providers 125. For example, the electronic devices 110 may include smartphones, PDAs, tablet devices, notebook computers, desktop computers, and/or any other device configured to display or present media content. In operation, when an electronic device 110 accesses a website, the electronic device 110 may execute a media player via which media content may be played, where the media player is rendered on the web browser of the electronic device 110 by the website provider 125. The electronic device 110 may enable a user to interact with and make selections indicated in the media players. The electronic devices 110 may communicate with the web site providers 125 (and in some cases, the analysis server 105 and the media entities 115) via the network(s) 120. It should be understood that the network(s) 120 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, and/or others).

As illustrated in FIG. 1, the analysis server 105 may include a context analysis module 106, an engagement analysis module 107, a content analysis module 108, a social media analysis module 111, and a topical analysis module 112. Each of the context analysis module 106, the engagement analysis module 107, the content analysis module 108, the social media analysis module 111, and the topical analysis module 112 may interface with various components and interfaces of the analysis server 105 to support and facilitate the corresponding functionalities. Further, one or more users or individuals (e.g., developers, programmers, administrators, etc.) may interface with each of the context analysis module 106, the engagement analysis module 107, the content analysis module 108, the social media analysis module 111, and the topical analysis module 112. Although illustrated as separate modules within the analysis server 105, it should be appreciated that two or more of the context analysis module 106, the engagement analysis module 107, the content analysis module 108, the social media analysis module 111, and the topical analysis module 112 may be combined into a single module.

The context analysis module 106 is generally configured to access and analyze information about the websites hosted by the website providers 125. For example, the context analysis module 106 may access and analyze HyperText Markup Language (HTML) code (and specifically, the tags of the HTML code) of individual webpages of the websites. Further, the context analysis module 106 may analyze URLs associated with the individual webpages. According to embodiments, the website information may indicate the type of website and the content thereof. For example, if the HTML code or any URLs of a website include the words "basketball," "baseball," "hockey," and "football," then the context analysis module 106 may deduce that the website is a sports website. It should be appreciated that the context analysis module 106 may examine or analyze the website using data separate from (and/or data included in) data associated with the media player. In particular, the context analysis module 106 may "crawl" the data of the websites to identify keywords, tags, and other relevant data, as well as perform any semantic analysis on the identified data. The context analysis module 106 may perform its identification and analysis at any point, and may associate the resulting data with a URL of the website. It should be appreciated that the context analysis module 106 may use any type of technique, model, algorithm, or the like to analyze the website information and determine a type or context of the website based on the analysis.

The engagement analysis module 107 is generally configured to analyze engagement data associated with a user's engagement and interaction with the websites (and media players thereof) hosted by the website providers 125. Typically, when a user accesses a website, the website can send a data snippet that is stored as a local data store on the web browser of the user. For example, the local data store may be in the form of a cookie. The local data stores can enable the website to store various stateful information (e.g., user login information). Further, the local data stores for each website hosted by the website providers 125 may record the user's activity on the website (e.g., button clicks, logins, page visits, etc.). In particular, the local data stores may record the user's activity related to playback of media content. For example, if a website embeds a video player, a cookie associated with the website can record user activity data such as play/pause/stop instances, full screen selections, volume adjustments, fast-forwarding, rewinding, amount of views, and the like. It should be appreciated that other techniques and components are envisioned for collecting and/or recording activity information such as web page scripts and others. In some implementations, various device identification and canvas fingerprinting techniques support general identifying data corresponding to the user, where the identifying data may correlate the user to a certain browser configuration which can be inferred to be the same user, without the need for client storage.

The engagement analysis module 107 may access the local data stores to retrieve and analyze the user activity data. In particular, the engagement analysis module 107 may store user activity data corresponding to an associated local data store of the electronic device 110. The analysis of the local data stores may indicate media content viewing habits of the users. For example, the engagement analysis module 107 may determine that a particular user typically skips video advertisements that are longer than thirty (30) seconds. In embodiments, the engagement analysis module 107 may analyze local data store data for a plurality of users across a plurality of website providers 125 to refine the analysis and determinations. Essentially, the engagement analysis module 107 may serve as a data management platform (DMP) that enables individuals or entities to create target audiences based on first-party and/or third-party browsing data, tailor campaigns to these audiences across third-party ad networks and exchanges, and measure the performance of campaigns across segments and channels. It should be appreciated that the engagement analysis module 107 may use any type of technique, model, algorithm, or the like to analyze the website information, determine viewing habits, and formulate strategies for media content selection.

The content analysis module 108 is generally configured to examine data associated with media content itself. In particular, the content analysis module 108 may examine metadata associated with individual media content files to identify keywords or tags included in the metadata. For example, if one media content file is an instructional video on how to grill a steak, the content analysis module 108 may identify, from video metadata, words or phrases such as "steak," "grilling," "how-to," and "cooking." The content analysis module 108 may further identify the keywords or tags from closed-captioning text associated with the media content. In some implementations, the content analysis module 108 may extract content data from the media content based on time log information. For example, a video file may include a cake baking portion from 0:01 to 4:45, followed by a salmon grilling portion from 4:46 to 10:00, whereby the content analysis module 108 may extract the corresponding content data based on which portion a user is viewing or has viewed.

The analysis server 105 may also communicate with various social networking services 135 via the network(s) 120. Generally, each social networking service 135 is a platform that supports social networks or social relations among people who share interests, activities, backgrounds, and/or real-life connections. Users within each social networking service 135 typically have an account with an associated profile and social links, whereby the social networking service 135 enables a variety of services for the users. According to embodiments, the social networking service 135 may send, to the analysis server 105, data related to media content consumption. The social networking data may include viewership metrics of various media content.

According to embodiments, the social media analysis module 111 may analyze the data retrieved from the social networking service 135 to further refined media content file selection. For example, the social media analysis module 111 may determine that a certain media file is shared between connections within the social networking service 135, and may prioritize the certain media file accordingly. Similarly, the topical analysis module 112 may analyze the data retrieved from the social networking service 135 to identify media files that are popular (e.g., "viral" or "trending" content). For example, the topical analysis module 112 may determine that a certain media file is "viral" if it is viewed or shared a threshold amount of times within a certain time period. Therefore, each of the modules 106, 107, 108, 111, and 112 of the analysis server 105 may perform a separate analysis of associated data, whereby the analyses may be used singularly or in combination with each other to identify relevant media files for playback within the media players.

A set of third-party sources 130, such as any company, corporation, individual, group of individuals, or the like, may also communicate with the analysis server 105 via the network(s) 120. According to some embodiments, the third-party sources 130 may partner with an entity associated with the analysis server 105, such as companies wishing to avail advertisements to website users. The analysis server 105 may therefore prioritize some of the media content based on priority requirements from the third-party sources 130. In other embodiments, the third-party entities 130 may offer applications or platforms to assist the analysis server 105 with collecting various of the data to be analyzed, or may otherwise serve as sources for some of the data to be analyzed. For example, the third-party entities 130 may compile various data that the engagement analysis module 107 may use as part of its DMP functionalities.

In operation, the analysis server 105 (and modules thereof) may analyze all available data to identify or select relevant media content to provide to the electronic devices 110 or otherwise cause the electronic devices 110 to avail to users, when the electronic devices 110 are accessing the associated website providers 125. The analysis server 105 may further update its models and algorithms as new engagement data or other data is received, thus improving the media content selection. Additionally, the analysis server 105 may provide feedback to various of the third-party sources 130, website providers 125, and/or media entities 115, to help the relevant entities in creating new media content, availing different content, or for other benefits.

Figure 2:
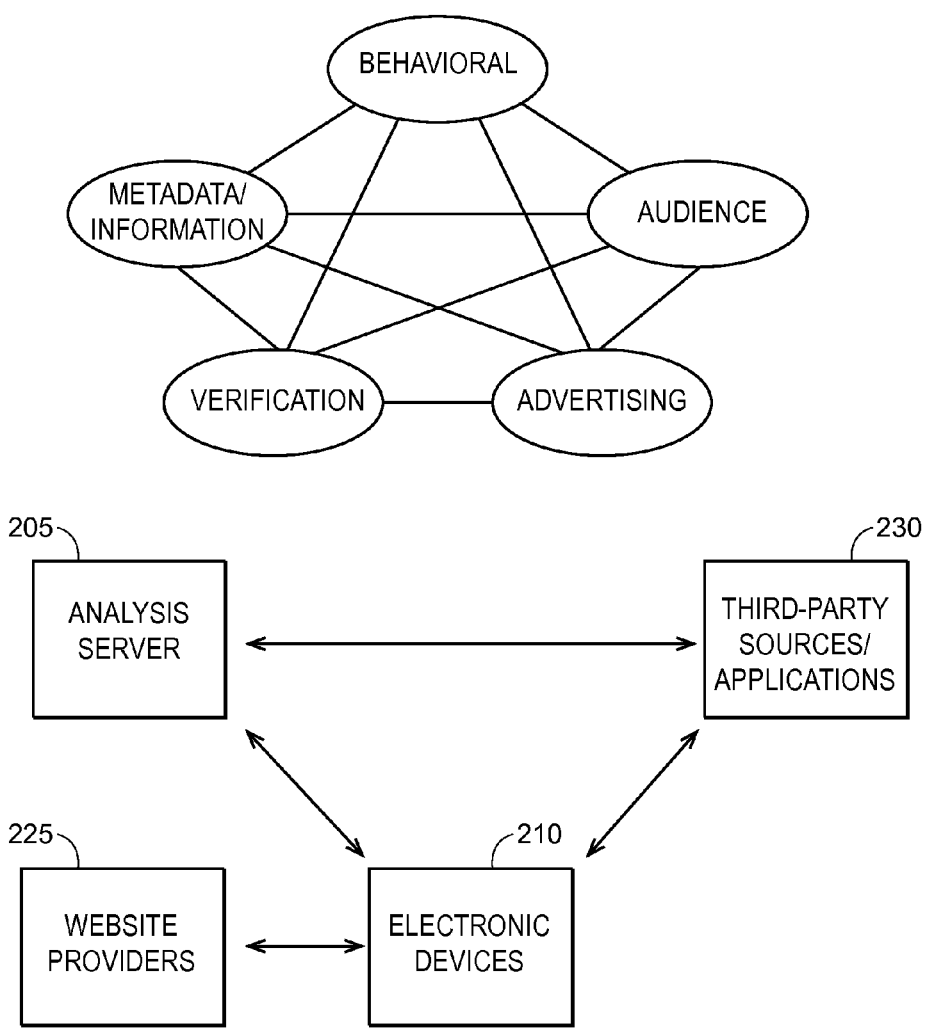
FIG. 2 depicts various communications and data types associated with components and entities configured to manage media content playback, in accordance with some embodiments.

FIG. 2 illustrates envisioned benefits of the systems and methods discussed herein. FIG. 2 depicts an analysis server 205 (such as the analysis server 105 as discussed with respect to FIG. 1), one or more third-party sources or applications 230 (such as the third-party sources 130 as discussed with respect to FIG. 1), one or more electronic devices 110 (such as the electronic devices 110 as discussed with respect to FIG. 1), and one or more website providers 225 (such as the website providers 125 as discussed with respect to FIG. 1).

Generally, the third-party sources or applications 230 may provide, to the analysis server 205, data related to media content playback via websites hosted by the website providers 225 and accessed by the electronic devices 210. In some cases, the data may be in the form of priority or requirements that may specify the analysis server 205 to select specific media content to provide to the electronic devices 210. In other cases, the data may be collected by the third-party sources 230, where the data is associated with playback of the media content. In particular, the data may be related to one of more of the categories illustrated in FIG. 2: behavioral, audience, advertising, verification, and metadata/information. The behavioral data may include, but is not limited to: site-level performance (e.g., page and media content), asset-level performance, user/audience behavior, publisher performance, provider performance, player performance, page/asset social activity, and/or the like. The analysis server 205 may compile the behavioral data from various of the third-party sources or applications 230 such as video hosting sites, marketing or analytics sources, video players, other websites, social channels, and others.

The audience data may include, but is not limited to: audience demographic information and segmentation, first party viewer data, consumer demographic information, consumer interests, online/offline consumer behavior, and/or the like. The analysis server 205 may compile the behavioral data from various of the third-party sources or applications 230 such as cross-media verification and information services, marketing and information management services, consumer data collection companies, and others.

The advertising data may include, but is not limited to: advertising campaigns and performance data, advertising revenue and payment data, campaign validation measurements, and/or the like. The analysis server 205 may compile the advertising data from various of the third-party sources or applications 230 such as internet analytics companies, ad management technology, ad trafficking services, monetization analytics companies, and others.

The verification data may include, but is not limited to: network and site-level performance data, network and site-level audience information, traffic and advertising viewing metrics, and/or the like. The analysis server 205 may compile the verification data from various of the third-party sources or applications 230 such as internet analytics companies, advertising campaign rating entities, content protection systems, and others.

The metadata/information may include, but is not limited to: asset-level metadata, publisher or provider deal terms, publisher information, player information, page-level data and placement, and/or the like. The analysis server 205 may compile the metadata/information from various of the third-party sources or applications 230 such as content management systems, client portals, partner teams, media management assistants, and others.

Figure 3:
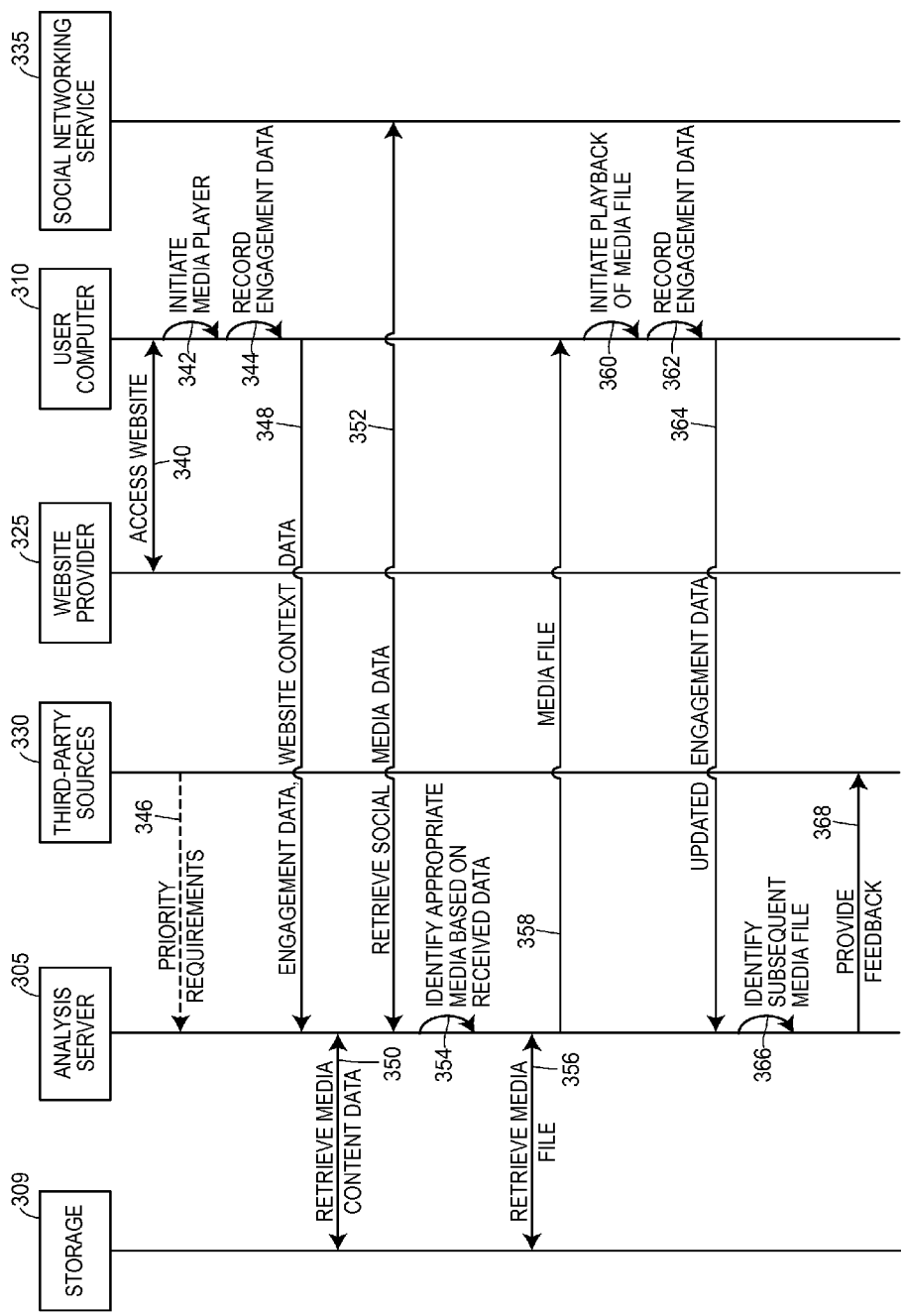
FIG. 3 depicts a signal diagram associated with managing media content playback, in accordance with some embodiments.

FIG. 3 depicts an example signaling diagram 300 facilitated by various components and entities, and associated with managing media content identification and playback. The signaling diagram 300 includes storage 309 (such as the storage 109 as discussed with respect to FIG. 1), an analysis server 305 (such as the analysis server 105 as discussed with respect to FIG. 1), a set of third-party sources 330 (such as the third-party sources 110 as discussed with respect to FIG. 1), a website provider 325 (such as the website provider 125 as discussed with respect to FIG. 1), a user computer 310 (such as one of the electronic devices 110 as discussed with respect to FIG. 1), and a social networking service 335 (such as the social networking service 135 as discussed with respect to FIG. 1).

The functionalities may begin with a user using the user computer 310 to access (340) a website hosted by the website provider 325. In some cases, the user may navigate throughout various webpages of the website. When the user computer 310 navigates to a webpage that supports a media player embedded therein, the website provider 325 may render the media player on the web browser of the user computer 310 and the user computer 310 may initiate (342) the media player. For example, the media player may be a video player configured to play a set of videos. In embodiments, the markup language associated with the webpage may include program code for the embedded media player.

The user computer 310 may record (344) engagement data from the user computer 310 related to user interaction with the media content playback. In particular, the engagement data may indicate play/pause/stop actions, volume adjustments, media completion data (e.g., in deciles), screen size adjustments, playlist or control actions, and/or other data. The engagement data may be associated with one or more local data stores that are associated with the website and stored on the user computer 310. The user computer 310 may send (348) the engagement data and optionally any website context data to the analysis server 305. In embodiments, the user computer 310 may send the engagement data to the analysis server 305 in real-time as the user computer 310 records the engagement data, such that the user computer 310 need not store the engagement data. In some cases, the analysis server 305 may examine or access any website data to identify the website context data. In particular, the analysis server 305 may analyze HTML code (and specifically, the tags of the HTML code) of individual webpages of the website as well as analyze any URLs associated with the individual webpages. In some implementations, a crawler component (that may be separate from or part of the analysis server 305) may perform a deep extraction on the webpages of the website as well as the media files associated therewith, and record the resulting data. The analysis server 305 may store the engagement data received from the user computer 310 for subsequent access or retrieval. In particular, the analysis server 305 may associate the engagement data with an identification (e.g., a cookie) of the user computer 310, such that the analysis server 305 maintains which engagement data is associated with which user computer 310.

In an optional embodiment, one of the third-party sources 330 may send (346) priority requirements to the analysis server 305. For example, a company wishing to advertise on the website of the website provider 325 may request for the analysis server 305 to play advertisements for the company (essentially, "branded content") in the embedded media player. As another example, an entity may wish to push out a new series of media content in an effort to gain initial views. It should be appreciated that other situations and scenarios are envisioned for the third-party source 330 to submit priority requirements for playback of media files.

The analysis server 305 may retrieve (350), from the storage 309, media content data. According to embodiments, the media content data may include metadata associated with the media files available in the storage 309. The metadata may indicate keywords or tags for the media files, which may indicate the types of media files as well as the content of the media files. In embodiments, the analysis server 305 may retrieve (352) social media data from the social media service 335. The social media data may indicate media files that are "viral," "trending," or otherwise have numerous views by users of various social networks. Further, the social media data may indicate media files associated with breaking news that may be of interest to users. The analysis server 305 may access the media files indicated in the social media data via a file path, link, or the like. In some cases, the analysis server 305 may store the media files indicated in the social media data in the storage 309.

The analysis server 305 may identify (354) appropriate media (or a preferred media file) based on one or more of the priority requirements, the engagement data, the website context data, the media context data, and the social media data. It should be appreciated that the analysis server 305 may weight or prioritize the data according to any convention. For example, the priority requirements may prevail over all of the engagement data, the website context data, the media context data, and the social media data. For further example, the engagement data, the website context data, the media context data, and the social media data may be weighted equally. Additionally, the analysis server 305 may identify, from the social media data, a media file as popular if the media file has been viewed at least a threshold number of times. As an additional example, the analysis server 305 may identify a media file based on a combination of the social media data and the engagement data. It should be appreciated that the analysis server 305 may perform or execute any type of model or algorithm in analyzing the data to identify the appropriate media.

After identifying the appropriate media, the analysis server 305 can retrieve (356) the media file from the storage 309. In some cases in which the media file may not be stored in the storage 309, the analysis server 305 may identify and record a link or reference (e.g., a URL) to the media file. The analysis server 305 can provide (358) the media file to the user computer 310, or otherwise cause the user computer 310 to access the media file (e.g., by providing the user computer 310 with a link to the media file). The user computer 310 may initiate (360) playback of the media file in the embedded media player. In some cases, the user computer 310 may load the media file within the embedded media player and the user of the user computer 310 may request to start playback of the media file (e.g., by selecting a "play" selection within the media player).

During playback of the media file, the user computer 310 may record (362) engagement data of the user. In particular, the user computer 310 may detect various selections made by the user during playback of the media file, and the user computer 310 may record the selections in an appropriate local data store stored on the user computer 310. The user computer 310 may provide (364) the updated engagement data to the analysis server 305. In some cases, the analysis server 305 may request the updated engagement data from the user computer 310. The analysis server 305 may store the updated engagement data received from the user computer 310 for subsequent access or retrieval. In particular, the analysis server 305 may associate the updated engagement data with an identification (e.g., a cookie) of the user computer 310.

The analysis server 305 may facilitate additional playback of additional media files within the media player. In particular, the analysis server 305 may identify (366) a subsequent media file based on various factors such as any of the updated engagement data, the original engagement data, website context data, media content data, social media data, and/or priority requirements. In this regard, the analysis server 305 may facilitate continuous playback of a plurality of media files within the media player. Further, the analysis server 305 may be configured to update the various models and/or algorithms used to identify the media files based on the updated and/or original engagement data as well as any additional website context data, media content data, social media data, and/or priority requirements. Accordingly, the analysis server 305 may become "smarter" in identifying more relevant or desirable media files.

The analysis server 305 may also provide (368) feedback related to the media file playback to one of the third party sources 330. For example, the analysis server 305 may determine that users are more engaged with certain media files versus other media files. Further, for example, the analysis server 305 may determine that users are generally more engaged while viewing a 30-second advertisement than when viewing a 60-second advertisement. It should be appreciated that additional feedback metrics are envisioned. Although not depicted in FIG. 2, it should be appreciated that various of the third-party sources 330 may provide, to the analysis server 305, additional metrics related to the media content playback.

Figure 4:
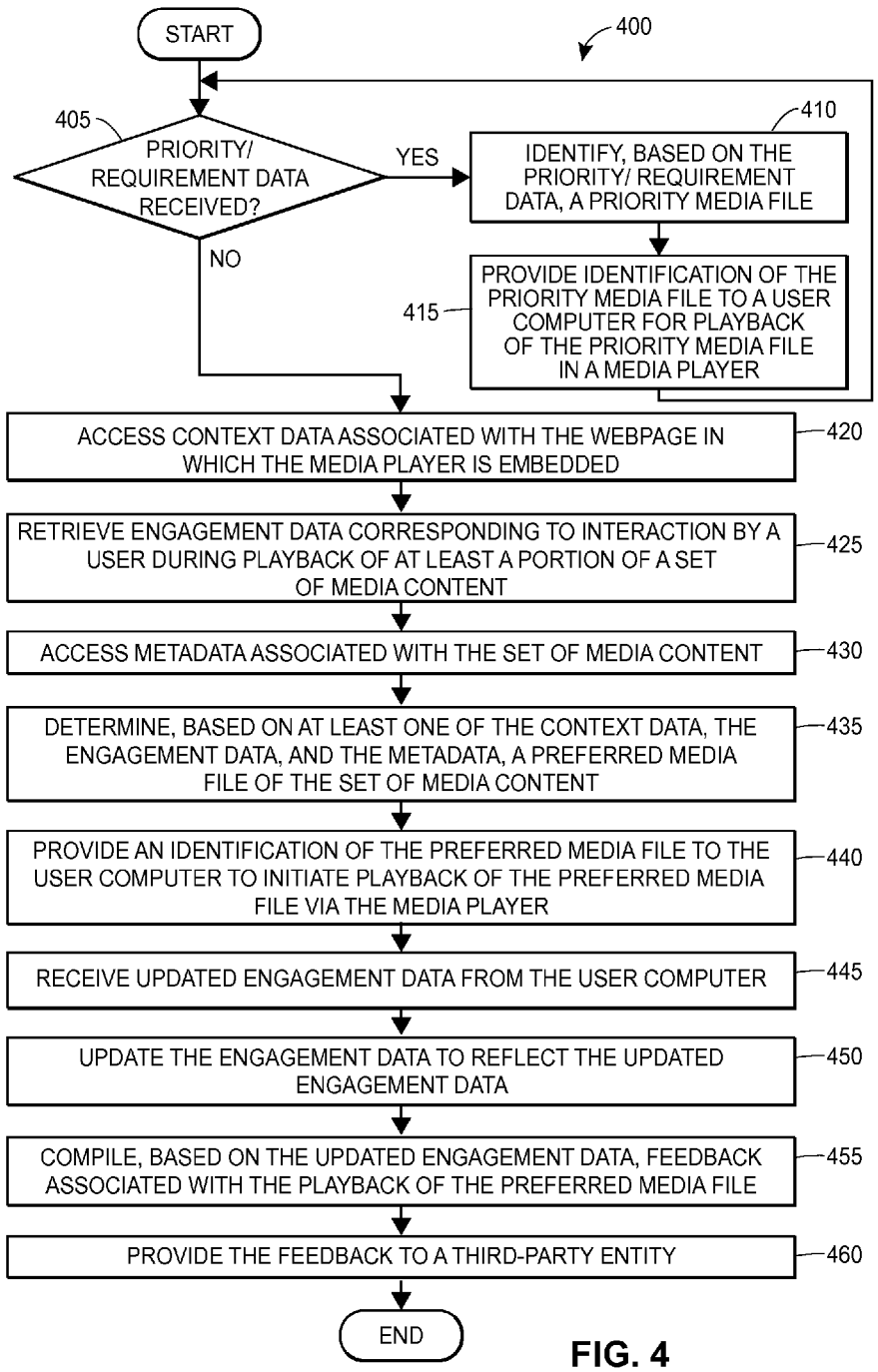
FIG. 4 depicts a flow diagram associated with an embodiment for managing media content playback, in accordance with some embodiments.

Referring to FIG. 4, depicted is a block diagram of an example method 400 for prioritizing media content in a media player embedded in a webpage hosted by a website server. The method 400 may be facilitated by a server, such as the analysis server 105 as discussed with respect to FIG. 1. The server may support one or more modules to facilitate the various functions as well as various interfaces to enable user input and selections. The analysis server 105 may facilitate the method 400 in response to a user computer accessing the webpage hosted by the website server, whereby the webpage renders a media player for playback of media files by the user computer.

The method 400 can begin with the server determining (block 405) whether priority or requirement data has been received or detected. In some cases, the priority or requirement data may be received from a third-party entity with associated media content that may have a playback priority. If priority or requirement data has been received or detected ("YES"), the server can identify (block 410), based on the priority or requirement data, a priority media file. Further, the server can provide (block 415) the identification of the priority media file to the user computer for playback of the priority media file in the media player. In embodiments, the server can retrieve the priority media file from storage and provide the priority media file directly to the user computer, or the server can provide an identification (e.g., a URL) of the priority media file to the user computer, where the user computer can access the priority media file via the identification.

If priority or requirement data has not been received or detected ("NO"), the server can access (block 420) context data associated with the webpage in which the media player is embedded or rendered. In particular, the server may access a set of tags included in markup language for the website, and may identify one or more keywords from the set of tags. The server may also "crawl" the website to access additional data as well as semantically analyze any accessed data. The server can further retrieve (block 425) engagement data corresponding to interaction by a user during playback of at least a portion of a set of media content. In particular, the server may retrieve or otherwise access engagement data associated with a local data store stored on a web browser of the user computer that indicates various interactions or actions that the user performs during the playback. Additionally, the server can access (block 430) metadata associated with the set of media content. In particular, the server can examine the metadata to identify a set of keywords associated with the media content.

The server can determine (block 435), based on at least one of the context data, the engagement data, and the metadata, a preferred media file of the set of media content. It should be appreciated that the server, in identifying the preferred media file, can weight the context data, the engagement data, and the metadata in any combination and/or according to any technique or algorithm. The server can provide (block 440) an identification of the preferred media file to the user computer to initiate playback of the preferred media file via the media player. In some cases, the server can retrieve the preferred media file from storage and provide the preferred media file directly to the user computer. In other cases, the server can provide an identification (e.g., a URL) of the preferred media file to the user computer, where the user computer can access the preferred media file via the identification.

The server may also receive (block 445) updated engagement data from the user computer, where the updated engagement data may correspond to the user's interaction during playback of the preferred media file. The server may update (block 450) the engagement data to reflect the updated engagement data. The server may therefore maintain up-to-date information associated with the user that the server may use to select or identify additional media files for playback on the media player.

The server may compile (block 455), based on the updated engagement data, feedback associated with the playback of the preferred media file. In embodiments, the feedback may include metrics associated with the user's interaction during playback of the preferred media file. The server may provide (block 460) the feedback to a third-party entity. In embodiments, the third-party entity may be any entity with an interest in the feedback, such as a marketing company, an advertising entity, a company, or the like.

Figure 5:
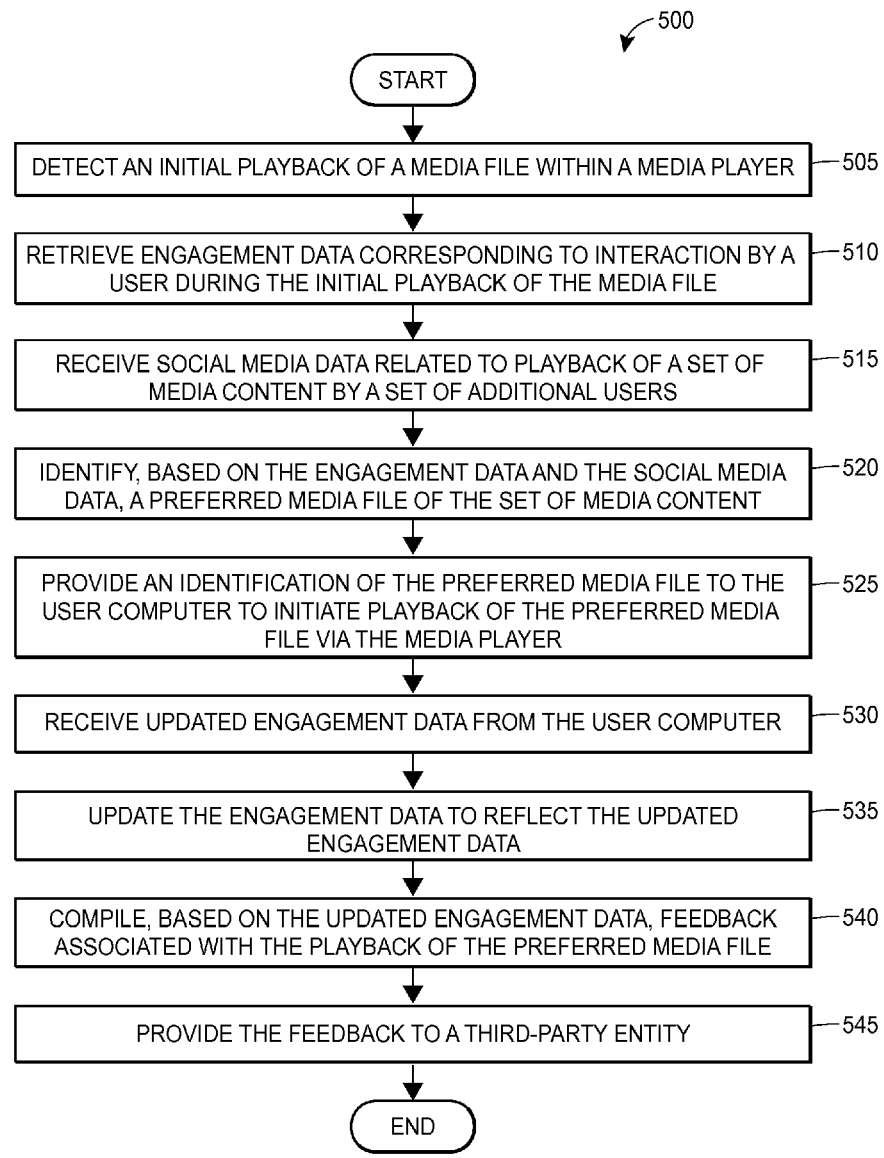
FIG. 5 depicts a flow diagram associated with another embodiment for managing media content playback, in accordance with some embodiments.

Referring to FIG. 5, depicted is a block diagram of an example method 500 for managing playback of media content in a media player embedded in a webpage hosted by a website server. The method 500 may be facilitated by a server, such as the analysis server 105 as discussed with respect to FIG. 1. The server may support one or more modules to facilitate the various functions as well as various interfaces to enable user input and selections. The analysis server 105 may facilitate the method 500 in response to a user computer accessing the webpage hosted by the website server, whereby the webpage renders a media player for playback of media files by the user computer The method 500 can begin with the server detecting (block 505) an initial playback of a media file within the media player. The server can further retrieve (block 510) engagement data corresponding to interaction by a user during the initial playback of the media file. In particular, the server may retrieve or otherwise access engagement data associated with a local data store stored on a web browser of the user computer that indicates various interactions or actions that the user performs during the playback. Although not depicted in FIG. 5, the server can also access context data associated with the webpage in which the media player is embedded. In particular, the server may access a set of tags included in markup language for the website, may identify one or more keywords from the set of tags, or may perform other "crawling" or analysis techniques. The server can additionally access metadata associated with the media file. In particular, the server can examine the metadata to identify a set of keywords associated with the media file.

The server may receive (block 515) social media data related to playback of a set of media content by a set of additional users. In embodiments, the set of additional users may or may not be "connected" to the user within the social network service. The server can identify (block 520), based on the engagement data and the social media data (and in some cases, the context data and the content data), a preferred media file of the set of media content. In one embodiment, the server can determine that the preferred media file has been viewed at least a threshold number of times. Further, in identifying the preferred media file, the server can determine, based on the engagement data, that the preferred media file is relevant to the user.

The server can provide (block 525) an identification of the preferred media file to the user computer to initiate playback of the preferred media file via the media player. In some cases, the server can retrieve the preferred media file from storage and provide the preferred media file directly to the user computer. In other cases, the server can provide an identification (e.g., a URL) of the preferred media file to the user computer, where the user computer can access the preferred media file via the identification.

The server may also receive (block 530) updated engagement data from the user computer, where the updated engagement data may correspond to the user's interaction during playback of the preferred media file. The server may update (block 535) the engagement data to reflect the updated engagement data. The server may therefore maintain up-to-date information associated with the user that the server may use to select or identify additional media files for playback on the media player.

The server may compile (block 540), based on the updated engagement data, feedback associated with the playback of the preferred media file. In embodiments, the feedback may include metrics associated with the user's interaction during playback of the preferred media file. The server may provide (block 545) the feedback to a third-party entity. In embodiments, the third-party entity may be any entity with an interest in the feedback, such as a marketing company, an advertising entity, a company, or the like.

Figure 6:
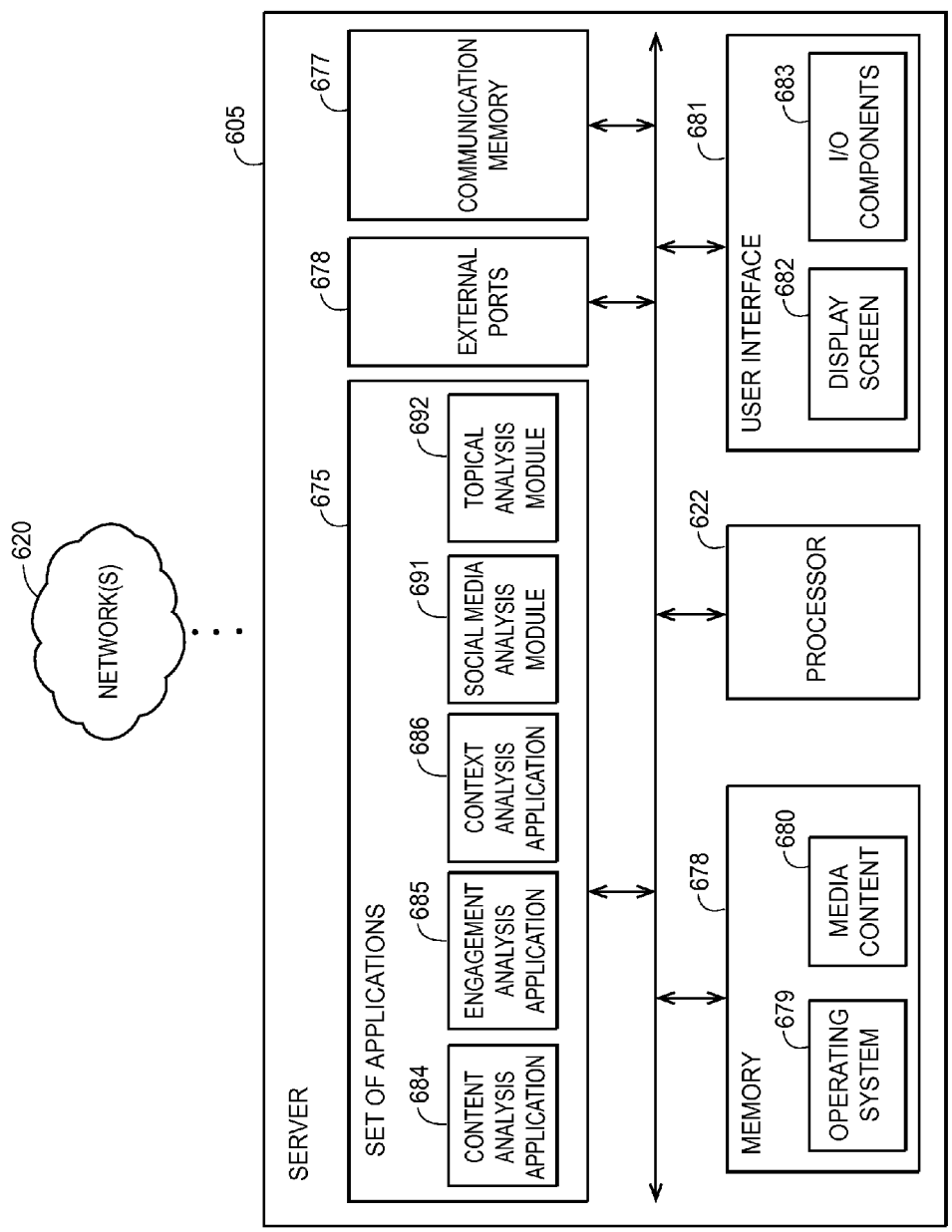
FIG. 6 is a block diagram of a server, in accordance with some embodiments.

FIG. 6 illustrates a diagram of an example server 605 (such as the analysis server 105 discussed with respect to FIG. 1) in which the functionalities as discussed herein may be implemented.

The server 605 can include a processor 622 as well as a memory 678. The memory 678 can store an operating system 679 capable of facilitating the functionalities as discussed herein as well as a set of applications 675 (i.e., machine readable instructions). For example, one of the set of applications 675 can be a content analysis application 684 configured to examine metadata of media content, another of the set of applications 675 can be an engagement analysis application 685 configured to compile engagement data related to user interactions with media content, another of the set of applications 675 can be a context analysis application 686 configured to examine website data, another of the set of applications 675 can be a social media analysis module configured to analyze social media data, and another of the applications 675 can be a topical analysis module 692 configured to identify "trending" or "viral" content. It should be appreciated that other applications are envisioned.

The processor 622 can interface with the memory 678 to execute the operating system 679 and the set of applications 675. According to embodiments, the memory 678 can also store media content 680 such as videos, images, audio files, and/or the like. The memory 678 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 605 can further include a communication module 677 configured to communicate data via one or more networks 620. According to some embodiments, the communication module 677 can include one or more transceivers (e.g., WWAN, WLAN, and/or WPAN transceivers) functioning in accordance with IEEE standards, 3GPP standards, or other standards, and configured to receive and transmit data via one or more external ports 678. For example, the communication module 677 can send, via the network 620, various media content to user computers. The processing server 605 may further include a user interface 681 configured to present information to a user and/or receive inputs from the user. As shown in FIG. 6, the user interface 681 includes a display screen 682 and I/O components 683 (e.g., ports, capacitive or resistive touch sensitive input panels, keys, buttons, lights, LEDs, speakers, microphones). According to embodiments, the user may access the server 605 via the user interface 681 to input media content requirements, analyze various data, and/or perform other functions. In some embodiments, the server 605 can perform the functionalities as discussed herein as part of a "cloud" network or can otherwise communicate with other hardware or software components within the cloud to send, retrieve, or otherwise analyze data.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 622 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed:

1. A computer-implemented method of managing playback of relevant media content in a media player embedded in a webpage hosted by a website server and accessed by an accessing user computer, the method comprising:
   detecting, by one or more processors, an initial playback of a media file within the media player;
   accessing context data associated with the webpage in which the media player is embedded;
   retrieving, by one or more processors, engagement data corresponding to media content viewing interaction activities by the accessing user during the initial playback of the media file, the engagement data including a number of openings of media files that the accessing user has initiated, a play time for each of the number of openings, and a number of subsequent plays of the opened media files;
   accessing individual media content file metadata associated with the set of media content;
   receiving social media data related to playback of a set of media content by a set of additional users;
   identifying, by the one or more processors based on the context data, the engagement data, the individual media content file metadata, and the social media data, a preferred media file of the set of media content; and
   providing an identification of the preferred media file to the accessing user computer to initiate playback of the preferred media file via the media player.

2. The computer-implemented method of claim 1, wherein identifying the preferred media file comprises:
   determining, based on the social media data, that the preferred media file has been viewed at least a threshold number of times; and
   determining that the social media data originated from a connection of the accessing user within a social networking service.

3. The computer-implemented method of claim 1, wherein identifying the preferred media file comprises:
   determining, based on the social media data, that the preferred media file has a rating above a threshold rating; and
   determining that the social media data originated from a connection of the accessing user within a social networking service.

4. The computer-implemented method of claim 1, wherein receiving the social media data comprises:
   determining, based on the social media data, that the preferred media file has been shared at least a threshold number of times between connections of a social network that includes the accessing user.

5. The computer-implemented method of claim 1, wherein providing the identification of the preferred media file to the accessing user computer comprises:
   identifying a uniform resource locator (URL) associated with the preferred media file;
   retrieving the preferred media file from storage based on the identified uniform resource locator (URL); and
   providing the URL associated with the preferred media file to the accessing user computer.

6. The computer-implemented method of claim 1 wherein the context data associated with the webpage in which the media player is embedded includes a size of the media player.

7. The computer-implemented method of claim 1, wherein
   accessing the individual media content file metadata associated with the media file includes:
   extracting time log information from an individual media content file characterizing portions of the individual media content file; and
   determining individual media content file metadata based on the accessing user viewing a portion of the individual media content file.

8. The computer-implemented method of claim 1, wherein the set of additional users are connections of the accessing user within a social networking service.

9. The computer-implemented method of claim 1, further comprising:
   receiving updated engagement data from the accessing user computer, the updated engagement data including engagement selections made by the accessing user during playback of the preferred media file identified by an analysis server and provided to the accessing user via the media player;
   updating previously received engagement data associated with the accessing user to reflect the updated engagement data;
   identifying a subsequent media file based on the updated engagement data, the context data, the individual media content file metadata, and the social media data; and
   providing a subsequent identification of the subsequent media file to the accessing user computer to initiate playback of the subsequent media file via the media player.

10. The computer-implemented method of claim 9, further comprising:
    determining a level of engagement of the accessing user with the preferred media file;
    determining a level of engagement of the accessing user with the subsequent media file;
    comparing the determined levels of engagement; and
    compiling feedback associated with compared determined levels of engagement.

11. The computer-implemented method of claim 10, further comprising:
    providing the feedback to a third-party entity and metrics associated with the accessing user's interaction during playback of the preferred media file.

12. A system for managing playback of relevant media content in a media player embedded in a webpage hosted by a website server and accessed by a user computer, comprising:
    a communication module configured to transmit data to the user computer;
    a memory storing a set of computer-executable instructions;
    a processor adapted to interface with the communication module and the memory, and configured to execute the set of computer-executable instructions to cause the processor to:
    detect an initial playback of a media file within the media player;
    access context data associated with the webpage in which the media player is embedded;

retrieve, via the communication module, engagement data corresponding to media content viewing interaction activities by an accessing user during the initial playback of the media file, the engagement data including a number of openings of media files that the accessing user has initiated, a play time for each of the number of openings, and a number of subsequent plays of the opened media files;

access individual media content file metadata associated with the set of media content;

receive social media data related to playback of a set of media content by a set of additional users;

identify, based on the context data, the individual media content file metadata, the engagement data and the social media data, a preferred media file of the set of media content; and provide, via the communication module, an identification of the preferred media file to the accessing user computer to initiate playback of the preferred media file via the media player.

13. The system of claim 12, wherein to identify the preferred media file, the processor is configured to:
determine, based on the social media data, that the preferred media file has been viewed at least a threshold number of times; and
determine, that the social media data originated from a connection of the accessing user within a social networking service.

14. The system of claim 12, wherein to identify the preferred media file, the processor is configured to:
determine, based on the social media data, that the preferred media file has a rating above a threshold rating; and
determine, that the social media data originated from a connection of the accessing user within a social networking service.

15. The system of claim 12, wherein to receive the social media data, the processor is configured to:
determine, based on the social media data, that the preferred media file has been shared at least a threshold number of times between connections of a social network that includes the accessing user.

16. The system of claim 12, wherein to provide the identification of the preferred media file to the accessing user computer, the processor is configured to:
identify a uniform resource locator (URL) associated with the preferred media file;
retrieve the preferred media file from storage based on the identified uniform resource locator (URL); and
provide the URL associated with the preferred media file to the accessing user computer.

17. The system of claim 12, wherein the context data associated with the webpage in which the media player is embedded includes a size of the media player.

18. The system of claim 12, wherein the processor is configured to execute the set of computer-executable instructions to further cause the processor to:
access the individual media content file metadata associated with the media file including:
extracting time log information from an individual media content file characterizing portions of the individual media content file; and
determining individual media content file metadata based on the accessing user viewing a portion of the individual media content file.

19. The system of claim 12, wherein the set of additional users are connections of the accessing user within a social networking service.

20. The system of claim 12, wherein the processor is configured to execute the set of computer-executable instructions to further cause the processor to:
receive updated engagement data from the accessing user computer, the updated engagement data including engagement selections made by the accessing user during playback of the preferred media file identified by an analysis server and provided to the accessing user via the media player;
update previously received engagement data associated with the accessing user to reflect the updated engagement data;
identify a subsequent media file based on the updated engagement data, the context data, the individual media content file metadata, and the social media data; and
provide a subsequent identification of the subsequent media file to the accessing user computer to initiate playback of the subsequent media file via the media player.

21. The system of claim 20, wherein the processor is configured to execute the set of computer-executable instructions to further cause the processor to:
determine a level of engagement of the accessing user with the preferred media file;
determine a level of engagement of the accessing user with the subsequent media file;
compare the determined levels of engagement; and
compile feedback associated with compared determined levels of engagement.

22. The system of claim 21, wherein the processor is configured to execute the set of computer-executable instructions to further cause the processor to:
provide the feedback to a third-party entity and metrics associated with the accessing user's interaction during playback of the preferred media file.

* * * * *